United States Patent
Liang

(10) Patent No.: US 7,529,365 B2
(45) Date of Patent: *May 5, 2009

(54) DEVICE AND METHOD OF APPLYING CHECK BIT TO ENCRYPT INSTRUCTION FOR PROTECTION

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1068 days.

This patent is subject to a terminal disclaimer.

(21) Appl. No.: 10/919,312

(22) Filed: Aug. 17, 2004

(65) Prior Publication Data

US 2005/0047591 A1 Mar. 3, 2005

(30) Foreign Application Priority Data

Aug. 28, 2003 (TW) ............................... 92123816 A

(51) Int. Cl.
*H04L 9/00* (2006.01)
*H04L 9/28* (2006.01)
(52) U.S. Cl. ........................................ 380/28; 713/180
(58) Field of Classification Search ........................ None
See application file for complete search history.

(56) References Cited

U.S. PATENT DOCUMENTS

| | | | |
|---|---|---|---|
| 4,507,783 A | 3/1985 | Austin et al. | |
| 4,661,980 A | 4/1987 | Byram | |
| 5,272,694 A * | 12/1993 | Bourgart et al. ............. | 370/296 |
| 6,888,944 B2 | 5/2005 | Lotspiech et al. | |
| 6,920,604 B2 * | 7/2005 | Coakeley et al. ............ | 714/802 |
| 7,313,235 B2 * | 12/2007 | Liang .......................... | 380/28 |
| 7,424,111 B2 * | 9/2008 | Liang .......................... | 380/28 |
| 2003/0076870 A1 | 4/2003 | Moon et al. | |

OTHER PUBLICATIONS

Callahan, R.W., Encrypting Decrypting Communication Link, IBM TDB 05-77, May 1, 1977, pp. 4564-4568.

* cited by examiner

*Primary Examiner*—Kaveh Abrishamkar
(74) *Attorney, Agent, or Firm*—Bacon & Thomas, PLLC

(57) ABSTRACT

A device for applying a check bit to encrypt instructions for protection includes a check-bit generator, a first check-bit location generator and a check-bit insertion unit. The check-bit generator generates a check bit in accordance with an instruction with a plurality of bits to be outputted. The first check-bit location generator generates an insertion position N (positive integer) for the check bit in accordance with the instruction and a predetermined algorithm. The check-bit insertion unit inserts the check bit in a position between (N−1)th-and Nth-bit of the instruction in accordance with the insertion position N generated by the first check bit location generator, thereby generating an encrypted instruction.

64 Claims, 4 Drawing Sheets

DEVICE AND METHOD OF APPLYING CHECK BIT TO ENCRYPT INSTRUCTION FOR PROTECTION

BACKGROUND OF THE INVENTION

1. Field of the Invention

The present invention relates to the technical field of instruction encryption and, more particularly, to a device and method of applying check bit to encrypt instruction for protection.

2. Description of Related Art

Due to the importance of intellectual properties, manufactories typically encrypt their intellectual property (IP) related programs off-line for protection and store the programs encrypted in a non-volatile memory or storage medium, such that an unauthorized person cannot restore the data even if he/she obtains the memory or storage medium with the programs encrypted, thereby achieving protection purpose.

U.S. Pat. No. 6,408,073 granted to Hsu, et al. for an "Scramble circuit to protect data in a read only memory" discloses a scramble circuit for protecting data stored in a read only memory (ROM) by applying both a pseudo-random generator and an initial value seed1/seed2 to code ROM data and thus generates encoded data. However, since the scrambling technology uses random numbers as parameters, such a data protection method requires a synchronous random generator for decoding. It also needs many patterns of random numbers to effectively prevent an unauthorized person from retrieving the programs encrypted, which means that a pseudo random generator for encoding and decoding needs highly complicated circuitry. Thus, the cost increases dramatically. On the contrary a simpler pseudo random generator for encoding and decoding can be used to save the cost, but in this way, programs encrypted can be retrieved by an unauthorized person easily.

Therefore, it is desirable to provide an improved device and method to mitigate and/or obviate the aforementioned problems.

SUMMARY OF THE INVENTION

The object of the present invention is to provide a device and method of applying check bit to encrypt instruction for protection, thereby avoiding complicated pseudo random generator in the prior art and thus saving cost, as well as increasing program security level.

In accordance with the first aspect of the present invention, there is provided a device of applying check bit to encrypt instruction for protection. The device includes a check-bit generator, a first check-bit location generator and a check-bit insertion unit. The check-bit generator generates a check bit in accordance with an instruction with a plurality of bits to be output. The first check-bit location generator generates an insertion position N (positive integer) for the check bit in accordance with the instruction and a predetermined algorithm. The check-bit insertion unit inserts the check bit in a position between (N−1)th- and Nth-bit of the instruction in accordance with the insertion position N generated by the first check bit location generator, thereby generating an encrypted instruction.

In accordance with the second aspect of the present invention, there is provided a device of applying check bit to encrypt instruction for protection. The device includes a check-bit generator, a first check-bit location generator and a check-bit insertion unit. The check-bit generator generates P check bits through a check algorithm device in accordance with an instruction with a plurality of bits to be output, where P is an integer greater than or equal to 1. The first check-bit location generator generates insertion positions $N_1, \ldots, N_P$ (integer respectively for N, P) for the P check bits in accordance with the instruction and a predetermined algorithm. The check-bit insertion unit inserts the P check bits respectively in a position between $(N_x-1)$th- and $(N_x)$th-bit of the instruction in accordance with the insertion positions $N_1, \ldots, N_P$ generated by the first check bit location generator, where $x=1, \ldots, P$, thus an encrypted instruction is generated.

In accordance with the third aspect of the present invention, there is provided a device of applying check bit to encrypt instruction for protection. The device includes a check-bit generator, a first check-bit location generator and a check-bit insertion unit. The check-bit generator generates a check bit in accordance with an instruction to be output, which has a plurality of bits and an operation code. The first check-bit location generator generates an insertion position N (positive integer) for the check bit in accordance with the operation code of the instruction and a predetermined algorithm, wherein the insertion position N is not in position of the operation code in the instruction. The check-bit insertion unit inserts the check bit in a position between (N−1)th- and Nth-bit of the instruction in accordance with the insertion position N generated by the first check bit location generator, thereby generating an encrypted instruction.

In accordance with the fourth aspect of the present invention, there is provided a device of applying check bit to encrypt instruction for protection. The device includes a check-bit generator, a first check-bit location generator and a check-bit insertion unit. The check-bit generator generates P check bits through a check algorithm device in accordance with an instruction to be output, wherein P is an integer greater than or equal to 1 and the instruction to be output has a plurality of bits and an operation code. The first check-bit location generator generates insertion positions $N_1, \ldots, N_P$ (integer respectively for N, P) for the P check bits in accordance with the operation code of the instruction and a predetermined algorithm, wherein the insertion positions $N_1, \ldots, N_P$ are not in position of the operation code in the instruction. The check-bit insertion unit inserts the P check bits respectively in a position between $(N_x-1)$th- and $(N_x)$th-bit of the instruction in accordance with the insertion positions $N_1, \ldots, N_P$ generated by the first check bit location generator, where $x=1, \ldots, P$, thus an encrypted instruction is generated.

In accordance with the fifth aspect of the present invention, there is provided a method of applying check bit to encrypt instruction for protection. The method includes: (A) generating a check bit in accordance with an instruction to be output, wherein the instruction has a plurality of bits; (B) generating an insertion position N (positive integer) for the check bit in accordance with the instruction and a predetermined algorithm; and (C) inserting the check bit in a position between (N−1)th- and Nth-bit of the instruction in accordance with the insertion position N generated at step (B), thereby generating an encrypted instruction.

In accordance with the sixth aspect of the present invention, there is provided a method of applying check bit to encrypt instruction for protection. The method includes: (A) generating P check bits through a check algorithm device in accordance with an instruction to be output, wherein P is an integer greater than or equal to 1; (B) generating insertion positions $N_1, \ldots, N_P$ (integer respectively for N, P) for the check bits in accordance with the instruction and a predetermined algorithm; and (C) inserting the P check bits generated at step (A), respectively in a position between $(N_x-1)$th- and $(N_x)$th-bit of the instruction in accordance with the insertion positions $N_1, \ldots, N_P$ generated at step (B), where $x=1 \ldots P$, thus an encrypted instruction is generated.

In accordance with the seventh aspect of the present invention, there is provided a method of applying check bit to encrypt instruction for protection is provided. The method includes: (A) generating a check bit in accordance with an instruction to be output, wherein the instruction has a plurality of bits and an operation code; (B) generating an insertion position N (positive integer) for the check bit in accordance with the operation code of the instruction and a predetermined algorithm, wherein the insertion position N is not in position of the operation code in the instruction; and (C) inserting the check bit in a position between (N−1)th- and Nth-bit of the instruction in accordance with the insertion position N generated at step (B), thereby generating an encrypted instruction.

In accordance with the eighth aspect of the present invention, there is provided a method of applying check bit to encrypt instruction for protection. The method includes: (A) generating P check bits through a check algorithm device in accordance with an instruction to be output, wherein P is an integer greater than or equal to 1 and the instruction has a plurality of bits and an operation code; (B) generating insertion positions $N_1, \ldots, N_P$ (integer respectively for N, P) for the check bits in accordance with the operation code of the instruction and a predetermined algorithm, wherein the insertion positions $N_1, \ldots, N_P$ are not in position of the operation code in the instruction; and (C) inserting the P check bits respectively in a position between $(N_x-1)$th- and $(N_x)$th-bit of the instruction in accordance with the insertion positions $N_1, \ldots, N_P$ generated at step (B), where $x=1 \ldots P$, thereby generating an encrypted instruction.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
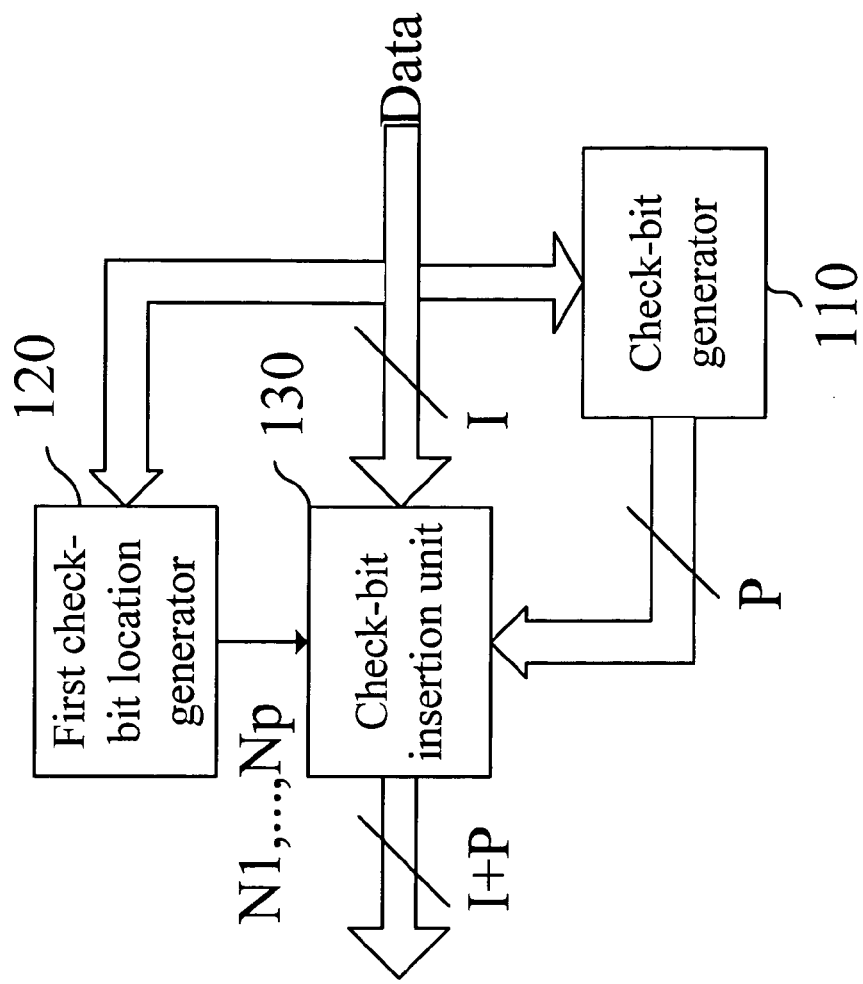
FIG. 1 is a block diagram of a device of applying check bit to encrypt instruction for protection in accordance with the invention.
Figure 1:
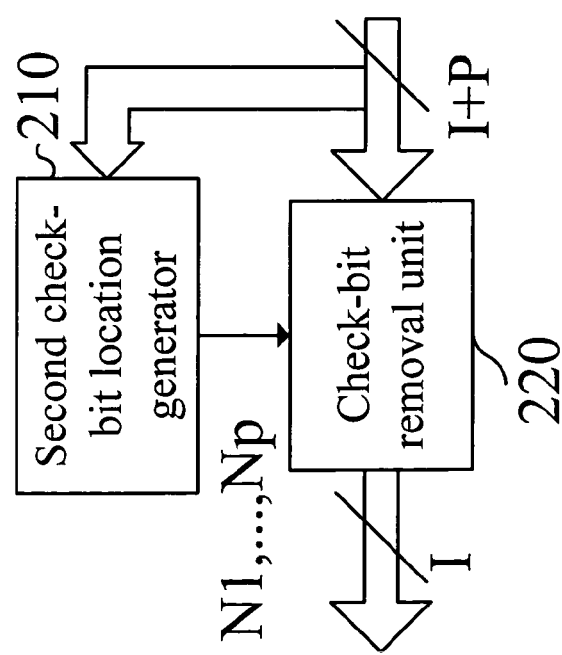

FIG. 1 is a block diagram of a device of applying check bit to encrypt instruction for protection in accordance with the invention. In FIG. 1, the device includes: a check-bit generator 110, a first check-bit location generator 120, a check-bit insertion unit 130, a second check-bit location generator 210 and a check-bit removal unit 220. As shown in FIG. 1, the check-bit generator 110, the first check-bit location generator 120 and the check-bit insertion unit 130 encrypt instruction(s) to be output. In addition, the second check-bit location generator 210 and the check-bit removal unit 220 decrypt the encrypted instruction(s).

The check-bit generator 110 generates P check bits in accordance with I-bit instruction to be outputted. For illustrative purpose, thirty-one bits are applied for the I-bit instruction (I=31) and only one bit is applied for the P check bits (P=1). Alternately, I can be 30 bits and P is 2 bit (I=30, P=2). Such an encrypted instruction has thirty-two bits for storing in an existing ROM or other non-volatile memory. The 31-bit instruction is processed by an XOR gate with thirty-one input terminals and one output terminal, thereby obtaining the check bit such as a parity.

In addition to the aforementioned parity, error correction code (ECC) and cyclic redundancy code (CRC) can be applied for the check bit.

The first check-bit location generator 120 generates insertion positions $N_1 \ldots N_P$ (positive integer respectively for $N_1 \ldots N_P$) for the P check bits in accordance with the instruction format and a predetermined algorithm. For example, the insertion positions $N_1 \ldots N_P$ are obtained by applying a key to a function of f(K), i.e., the integers $N_1 \ldots N_P$ respectively represent positions where the P check bits are located in the I-bit instruction.

Figure 2:
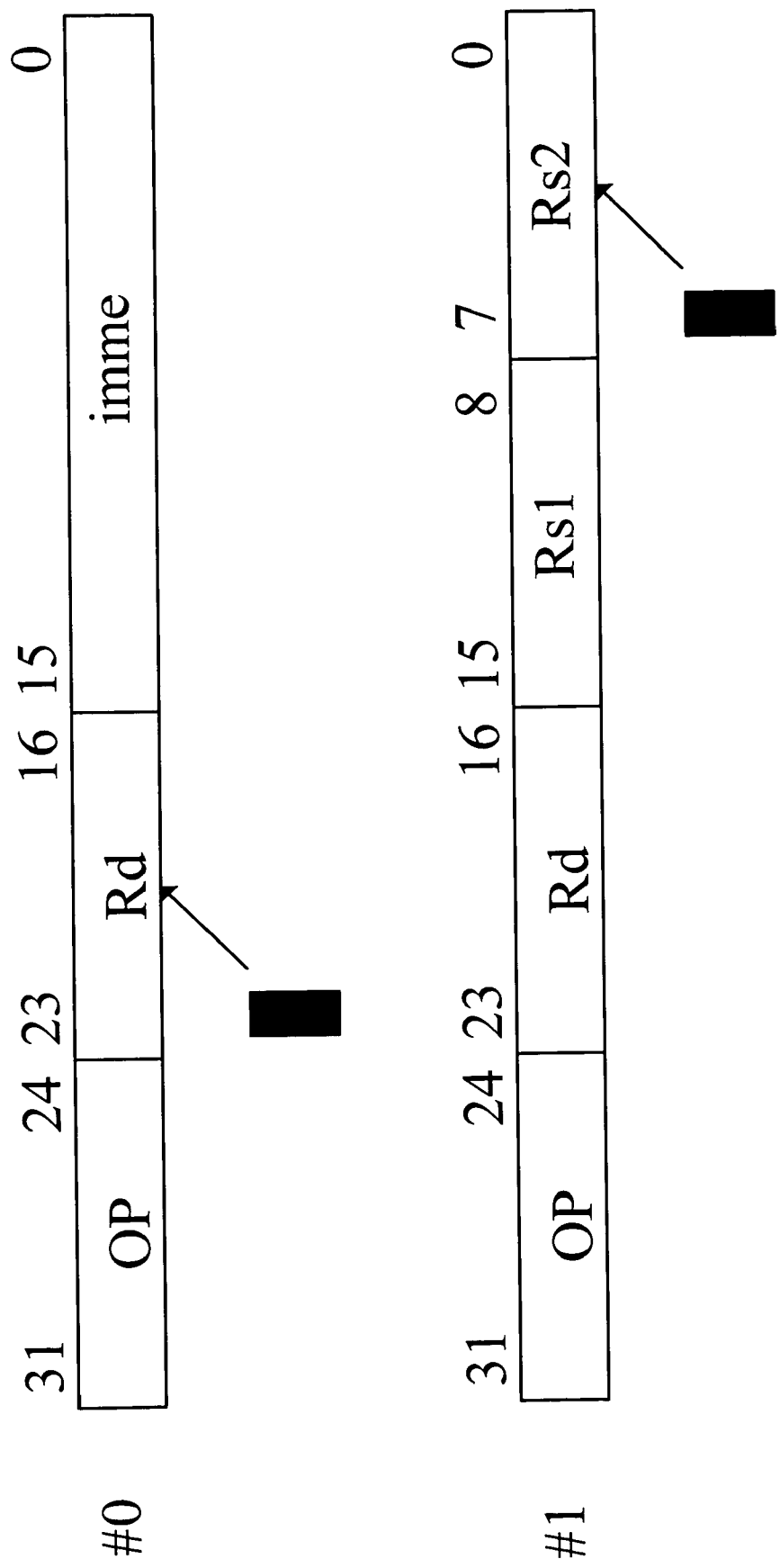
FIG. 2 is an embodiment of insertion position in accordance with the invention.

FIG. 2 is a schematic diagram of insertion position N generated by the first check-bit location generator 120. As shown in FIG. 2, the first check-bit location generator 120 generates the insertion position N for the check bit in accordance with a format of instruction #0 and a predetermined algorithm. For example, the instruction #0 has an operation code OP located at 31 th-24th bits, which indicates the instruction #0 as a register-immediate instruction (RI-form), i.e., an instruction format with 23th-16th bits for a register and 15th-0th bits for an immediate value. As such, when the first check-bit location generator 120 detects the instruction as the RI-form, the insertion positions for the check bits are found by computing in accordance with predefined rules. In this case, the insertion position N for the check bit is limited at an integer from 23 to 16. Namely, the aforementioned 1-bit check bit is located at position for the register encoding (23th to 16th bits) and then the insertion position N with respect to the check bit is generated by applying a key to a function of f(K).

Alternatively, instruction #1 has an operation code OP as a register-register instruction (RR-form), i.e., an instruction format with 23th-16th bits for register Rd, 15th-8th bits for register Rs1 and 7th-0th bits for register Rs2. As such, when the first check-bit location generator 120 detects the instruction #1 as the RR-form, the insertion positions for the check bits are found by computing in accordance with predefined rules. In this case, the insertion position N for the check bit is limited at an integer from 7 to 0. Namely, the cited 1-bit check bit is located at position for register Rs2 encoding (7th to 0th bits) and then the insertion position N with respect to the check bit is generated by applying a key to a function of f(K). Accordingly, the insertion position N for the check bit is found harder by guesses.

Figure 3:
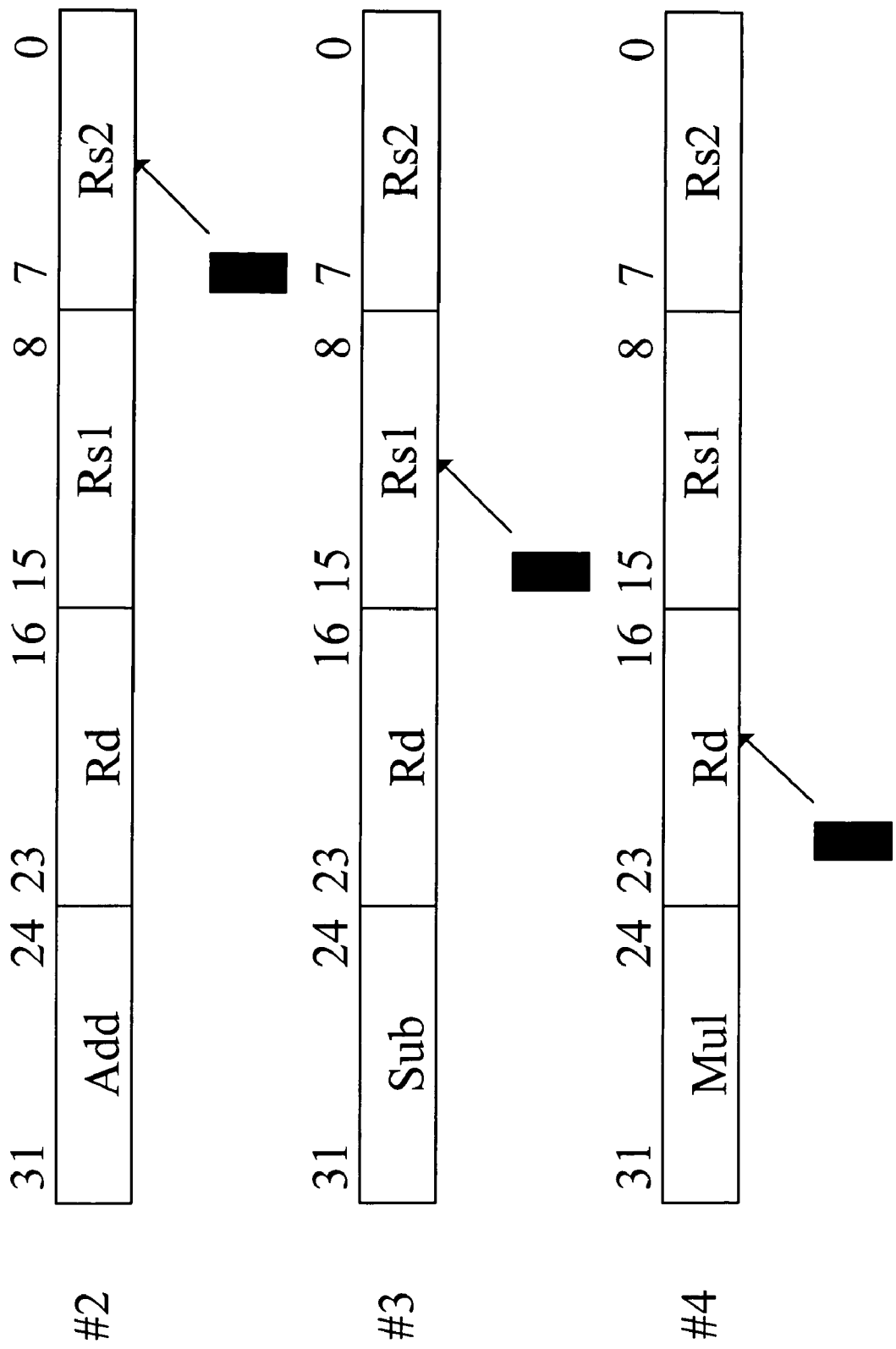
FIG. 3 is another embodiment of insertion position in accordance with the invention.

FIG. 3 is a schematic diagram of another embodiment of insertion position N generated by the first check-bit location generator 120. As shown, the first check-bit location generator 120 generates an insertion position N for the check bit in accordance with the content of an instruction code and a predetermined algorithm. For example, after instruction #2 executes an addition of registers Rs1 and Rs2 and the adding result is stored in register Rd, where operation code Add of the instruction #2, register Rd, register Rs1 and register Rs2 are located respectively in 31th to 24th bits, 23th to 16th bits, 15th to 8th bits and 7th to 0th bits. The first check-bit location generator 120 limits the insertion position N at an integer from 7 to 0, namely, locating the 1-bit check bit at a position for register Rs1 coding (7th to 0th bits) and then applies a key to a function of f(K) to produce the integer N.

After instruction #3 executes subtraction of registers Rs1 and Rs2, the subtracting result is stored in register Rd, where operation code Sub of the instruction #3, register Rd, register Rs1 and register Rs2 are located respectively in 31th to 24th bits, 23th to 16th bits, 15th to 8th bits and 7th to 0th bits. The first check-bit location generator 120 limits the insertion position N at an integer from 15 to 8, namely, locating the 1-bit check bit at a position for register Rs1 coding (15th to 8th bits) and then applies a key to a function of f(K) to produce the integer N.

After instruction #4 executes multiplication of registers Rs1 and Rs2, the multiplying result is stored in register Rd, where operation code Mul of the instruction #4, register Rd, register Rs1 and register Rs2 are located respectively in 31st to 24th bits, 23rd to 16th bits, 15th to 8th bits and 7th to 0th bits. The first check-bit location generator 120 limits the insertion position N at an integer from 23 to 16, namely, locating the 1-bit check bit at a position for register Rd coding (23rd to 16th bits) and then applies a key to a function of f(K) to produce the integer N.

The check bit inserting unit 130 inserts the P check bits in a position between $(N_x-1)$th- and $(N_x)$th-bit of the I-bit instruction in accordance with the insertion position $N_x$ (x=1 . . . P) generated by the first check-bit location generator 120, thereby generating an encrypted (I+P) instruction.

Additionally, integers $N_1, \ldots, N_P$ can further be generated by performing a function of right rotation or left rotation to produce an integer representing the insertion position. Thus, randomness of the insertion position N is increased and accordingly the insertion position cannot be obtained by reverse inference.

The second check-bit location generator 210 also generates the insertion positions $N_1, \ldots, N_P$ respectively for the P check bits in accordance with the instruction and the predetermined algorithm. Namely, the insertion positions $N_1, \ldots, N_P$ are obtained by applying a key to the function of f(K), which represent positions where the P check bits are located respectively in the encrypted (I+P)-bit instruction. The check-bit removal unit 220 can receive the encrypted (I+P)-bit instruction and removes the $(N_1)$th- to $(N_P)$th-bit from the received encrypted instruction in accordance with the insertion positions $N_1 \ldots N_P$ generated by the second check-bit location generator 210, thereby obtaining a decrypted instruction.

Figure 4:
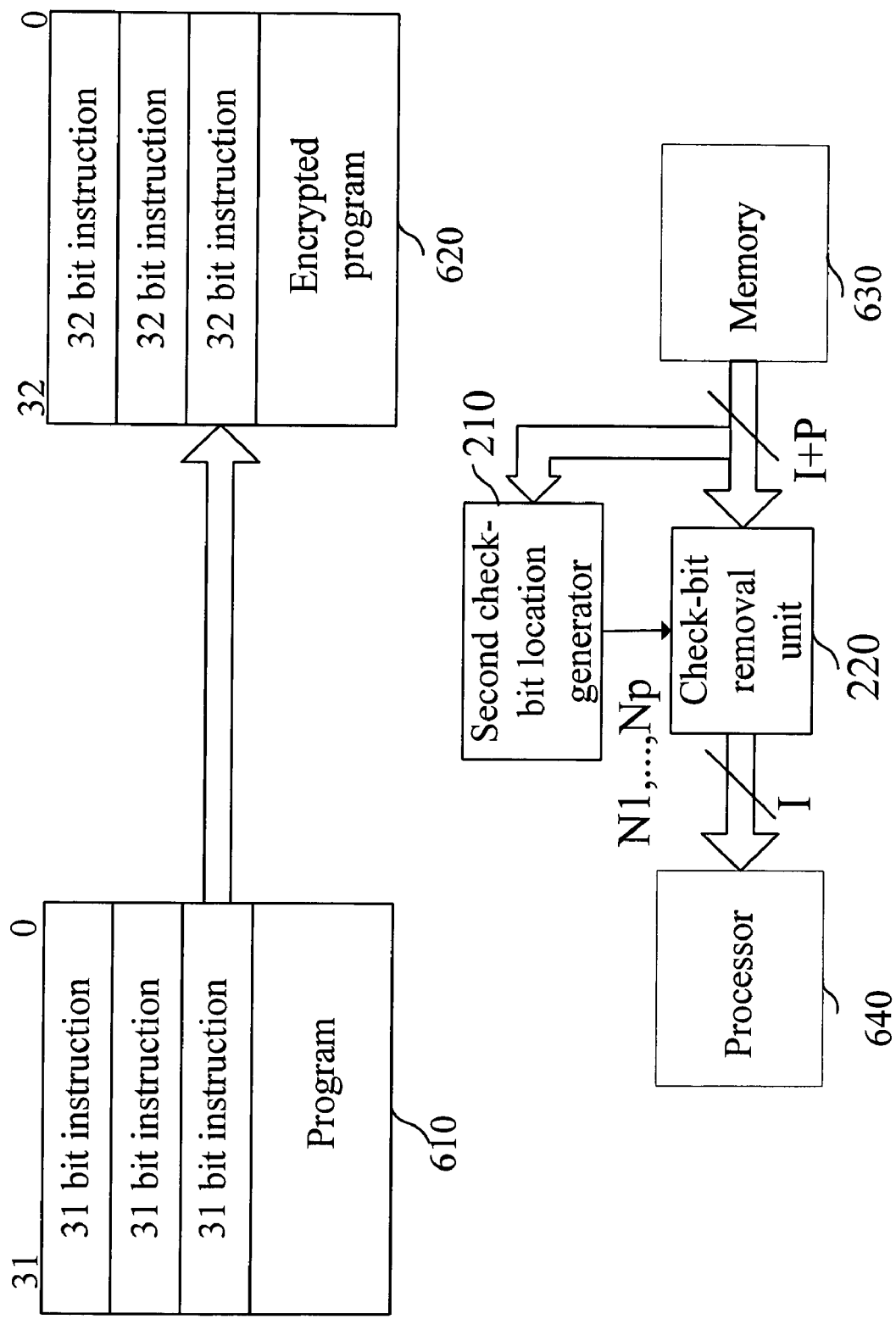
FIG. 4 is a block diagram of an application in accordance with the invention.

FIG. 4 is an application of the invention. In FIG. 4, a program 610 has a plurality of 31-bit instructions. As shown in FIG. 4, the program 610 can be encrypted by inserting 1-bit check bit in each 31-bit instruction in accordance with the invention. Thus, the program 610 is converted into an encrypted program 620 and then stored in a memory 630. As such, the encrypted program 620 is a 32-bit program for storing in a current ROM or other non-volatile memory. Such a conversion can be processed by a software in off-line.

When a typical processor 640 performs the program 620, it reads the program 620 in the memory 630. The second check-bit location generator 210 generates the insertion position N for the check bit, such that the check-bit removal unit 220 can remove the insertion position N for decryption and then restore the program 610 to obtain the decrypted instruction based on the insertion position N generated by the generator 210. Accordingly, program protection is achieved.

In view of foregoing, it is known that the invention can protect program without using complicated pseudo random generator. In addition, hardware for generating and removing parities or check bits is very simple, which spends fewer clocks and has better performance than the prior art.

Although the present invention has been explained in relation to its preferred embodiment, it is to be understood that many other possible modifications and variations can be made without departing from the spirit and scope of the invention as hereinafter claimed.

What is claimed is:

1. A device of applying check bit to encrypt instruction for protection, comprising:
   a check-bit generator, which generates a check bit in accordance with an instruction to be output, wherein the instruction has a plurality of bits;
   a first check-bit location generator, which generates an insertion position N (positive integer) for the check bit in accordance with the instruction and a predetermined algorithm; and
   a check-bit insertion unit, which inserts the check bit in a position between (N−1)th- and Nth-bit of the instruction in accordance with the insertion position N generated by the first check-bit location generator, thereby generating an encrypted instruction.

2. The device as claimed in claim 1, further comprising:
   a second check-bit location generator, which generates the insertion position N for the check bit in accordance with the instruction and the predetermined algorithm; and
   a check-bit removal unit, which receives the encrypted instruction and removes Nth bit of the encrypted instruction in accordance with the insertion position N generated by the second check bit location generator.

3. The device as claimed in claim 2, wherein the first and second check-bit location generators generate the insertion position N by applying a function of right rotation in accordance with the instruction's format and a special integer.

4. The device as claimed in claim 2, wherein the first and second check-bit location generators generate the insertion position N by applying a function of left rotation in accordance with the instruction's format and a special integer.

5. The device as claimed in claim 1, wherein the instruction has 31 bits.

6. The device as claimed in claim 1, wherein the check bit is a parity bit.

7. The device as claimed in claim 1, wherein the check bit is an error correction code (ECC) check bit.

8. The device as claimed in claim 1, wherein the check bit is a cyclic redundancy code (CRC) check bit.

9. A device of applying check bit to encrypt instruction for protection, comprising:
   a check-bit generator, which generates P check bits through a check algorithm device in accordance with an instruction to be output, where P is an integer greater than or equal to 1 and the instruction has a plurality of bits;
   a first check-bit location generator, which generates insertion positions $N_1, \ldots, N_P$ (integer respectively for N, P) for the P check bits in accordance with the instruction and a predetermined algorithm; and
   a check-bit insertion unit, which inserts the P check bits respectively in a position between $(N_x-1)$th- and $(N_x)$th-bit of the instruction in accordance with the insertion positions $N_1, \ldots, N_P$ generated by the first check bit location generator, where x=1, ..., P, thereby generating an encrypted data.

10. The device as claimed in claim 9, further comprising:
    a second check-bit location generator, which generates the insertion positions $N_1, \ldots, N_P$ for the P check bits in accordance with the instruction and the predetermined algorithm; and
    a check-bit removal unit, which receives the encrypted instruction and removes the P check bits from the encrypted instruction received in accordance with the insertion positions $N_1, \ldots, N_P$ generated by the second check bit location generator.

11. The device as claimed in claim 9, wherein the check algorithm device is a parity check device.

12. The device as claimed in claim 9, wherein the check algorithm device is an ECC device.

13. The device as claimed in claim 9, wherein the check algorithm device is a CRC device.

14. The device as claimed in claim 10, wherein the first and second check-bit location generators generate the insertion position N by applying a function of right rotation in accordance with the instruction's format and a special integer.

15. The device as claimed in claim 10, wherein the first and second check-bit location generators generate the insertion position N by applying a function of left rotation in accordance with the instruction's format and a special integer.

16. The device as claimed in claim 9, wherein I+P=32, I is the number of bits in the instruction.

17. A device of applying check bit to encrypt instruction for protection, comprising:
   a check-bit generator, which generates a check bit in accordance with an instruction to be outputted, the instruction having a plurality of bits and an operation code;
   a first check-bit location generator, which generates an insertion position N (positive integer) for the check bit in accordance with the operation code of the instruction and a predetermined algorithm, wherein the insertion position N is not in position of the operation code in the instruction; and
   a check-bit insertion unit, which inserts the check bit in a position between (N−1)th- and Nth-bit of the instruction in accordance with the insertion position N generated by the first check bit location generator, thereby generating an encrypted instruction.

18. The device as claimed in claim 17, further comprising:
   a second check-bit location generator, which generates the insertion position N for the check bit in accordance with the operation code of the instruction and the predetermined algorithm; and
   a check-bit removal unit, which receives the encrypted instruction and removes Nth bit of the encrypted instruction received in accordance with the insertion position N generated by the second check bit location generator.

19. The device as claimed in claim 18, wherein the first and second check-bit location generators generate the insertion position N by applying a function of right rotation in accordance with the operation code of the instruction and a special integer.

20. The device as claimed in claim 18, wherein the first and second check-bit location generators generate the insertion position N by applying a function of left rotation in accordance with the operation code of the instruction and a special integer.

21. The device as claimed in claim 17, wherein the instruction has 31 bits.

22. The device as claimed in claim 17, wherein the check bit is a parity bit.

23. The device as claimed in claim 17, wherein the check bit is an error correction code (ECC) check bit.

24. The device as claimed in claim 17, wherein the check bit is a cyclic redundancy code (CRC) check bit.

25. A device of applying check bit to encrypt instruction for protection, comprising:
   a check-bit generator, which generates P check bits through a check algorithm device in accordance with an instruction to be outputted, wherein P is an integer greater than or equal to 1 and the instruction has a plurality of bits and an operation code;
   a first check-bit location generator, which generates insertion positions $N_1, \ldots, N_P$ (integer respectively for N, P) for the P check bits in accordance with the operation code of the instruction and a predetermined algorithm, wherein the insertion positions $N_1, \ldots, N_P$ is not in position of the operation code in the instruction; and
   a check-bit insertion unit, which inserts the P check bits respectively in a position between $(N_x-1)$th- and $(N_x)$th-bit of the instruction in accordance with the insertion positions $N_1, \ldots, N_P$ generated by the first check bit location generator, where x=1, ..., P, thereby generating an encrypted instruction.

26. The device as claimed in claim 25, further comprising:
   a second check-bit location generator, which generates the insertion positions $N_1, \ldots, N_P$ respectively for the P check bits in accordance with the operation code of the instruction and the predetermined algorithm; and
   a check-bit removal unit, which receives the encrypted instruction and removes the P check bits from the encrypted instruction received in accordance with the insertion positions $N_1, \ldots, N_P$ generated by the second check bit location generator.

27. The device as claimed in claim 25, wherein the check algorithm device is a parity check device.

28. The device as claimed in claim 25, wherein the check algorithm device is an ECC device.

29. The device as claimed in claim 25, wherein the check algorithm device is a CRC device.

30. The device as claimed in claim 25, wherein the first and second check-bit location generators generate the insertion position N by applying a function of right rotation in accordance with the operation code of the instruction and a special integer.

31. The device as claimed in claim 25, wherein the first and second check-bit location generators generate the insertion position N by applying a function of left rotation in accordance with the operation code of the instruction and a special integer.

32. The device as claimed in claim 25, wherein I+P=32, I is the number of bits in the instruction.

33. A method of applying check bit to encrypt instruction for protection, comprising the steps of:
   (A) generating a check bit in accordance with an instruction to be output, wherein the instruction has a plurality of bits;
   (B) generating an insertion position N (positive integer) for the check bit in accordance with the instruction and a predetermined algorithm; and
   (C) inserting the check bit generated at step (A) in a position between (N−1)th- and Nth-bit of the instruction in accordance with the insertion position N generated at step (B), thereby generating an encrypted instruction.

34. The method as claimed in claim 33, further comprising the steps of:
   (D) inputting the encrypted data;
   (E) generating the insertion position N for the check bit in accordance with the instruction and the predetermined algorithm; and
   (F) removing Nth bit of the encrypted data in accordance with the insertion position N generated at step (E).

35. The method as claimed in claim 34, wherein the steps (B) and (E) generate the insertion position by applying a function of right rotation in accordance with the instruction's format and a special integer.

36. The method as claimed in claim 34, wherein the steps (B) and (E) generate the insertion position by applying a function of left rotation in accordance with the instruction's format and a special integer.

37. The method as claimed in claim 33, wherein the instruction has 31 bits.

38. The method as claimed in claim 33, wherein the check bit is a parity bit.

39. The method as claimed in claim 33, wherein the check bit is an error correction code (ECC) check bit.

40. The method as claimed in claim 34, wherein the check bit is a cyclic redundancy code (CRC) check bit.

41. A method of applying check bit to encrypt instruction for protection, comprising the steps of:
   (A) generating P check bits through a check algorithm device in accordance with an instruction to be outputted, where P is an integer greater than or equal to 1 and the instruction has a plurality of bits;
   (B) generating insertion positions $N_1, \ldots, N_P$ (integer respectively for N, P) for the P check bits in accordance with the instruction and a predetermined algorithm; and
   (C) inserting the P check bits generated at step (A) respectively in a position between $(N_x-1)$th- and $(N_x)$th-bit of the instruction in accordance with the insertion positions $N_1, \ldots, N_P$ generated at step (B), where $x=1, \ldots, P$, thereby generating an encrypted data.

42. The method as claimed in claim 41, further comprising the steps of:
   (D) inputting the encrypted data;
   (E) generating the insertion positions $N_1, \ldots, N_P$ for the P check bits in accordance with the instruction and the algorithm; and
   (F) removing the P check bits from the encrypted instruction input in accordance with the insertion positions $N_1, \ldots, N_P$ generated at step (E).

43. The method as claimed in claim 41, wherein the check algorithm uses a parity check algorithm.

44. The method as claimed in claim 41, wherein the check algorithm uses an ECC algorithm.

45. The method as claimed in claim 41, wherein the check algorithm uses a CRC algorithm.

46. The method as claimed in claim 42, wherein the steps (B) and (E) generate the insertion position by applying a function of right rotation in accordance with the instruction's format and a special integer.

47. The method as claimed in claim 42, wherein the steps (B) and (E) generate the insertion position by applying a function of left rotation in accordance with the instruction's format and a special integer.

48. The method as claimed in claim 42, wherein I+P=32, I is the number of bits in the instruction.

49. A method of applying check bit to encrypt instruction for protection, comprising the steps of:
   (A) generating a check bit in accordance with an instruction to be output, wherein the instruction has a plurality of bits and an operation code;
   (B) generating an insertion position N (positive integer) for the check bit in accordance with the operation code of the instruction and a predetermined algorithm, wherein the insertion position N is not in position of the operation code in the instruction; and
   (C) inserting the check bit generated at step (A) in a position between (N−1)th- and Nth-bit of the instruction in accordance with the insertion position N generated at step (B), thereby generating an encrypted instruction.

50. The method as claimed in claim 49, further comprising the steps of:
   (D) inputting the encrypted data;
   (E) generating the insertion position N for the check bit in accordance with the operation code of the instruction and the predetermined algorithm; and
   (F) removing Nth bit of the encrypted data in accordance with the insertion position N generated at step (E).

51. The method as claimed in claim 50, wherein the steps (B) and (E) generate the insertion position by applying a function of right rotation in accordance with the instruction's format and a special integer.

52. The method as claimed in claim 50, wherein the steps (B) and (E) generate the insertion position by applying a function of left rotation in accordance with the instruction's format and a special integer.

53. The method as claimed in claim 49, wherein the instruction has 31 bits.

54. The method as claimed in claim 49, wherein the check bit is a parity bit.

55. The method as claimed in claim 49, wherein the check bit is an error correction code (ECC) check bit.

56. The method as claimed in claim 49, wherein the check bit is a cyclic redundancy code (CRC) check bit.

57. A method of applying check bit to encrypt instruction for protection, comprising the steps of:
   (A) generating P check bits through a check algorithm device in accordance with an instruction to be outputted, wherein P is an integer greater than or equal to 1 and the instruction has a plurality of bits and an operation code;
   (B) generating insertion positions $N_1, \ldots, N_P$ (integer respectively for N, P) for the check bits in accordance with the operation code of the instruction and a predetermined algorithm, wherein the insertion positions $N_1, \ldots, N_P$ do not locate at position of the operation code in the instruction; and
   (C) inserting the P check bits respectively in a position between $(N_x-1)$th- and $(N_x)$th-bit of the instruction in accordance with the insertion positions $N_1, \ldots, N_P$ generated at step (B), where $x=1 \ldots P$, thereby generating an encrypted instruction.

58. The method as claimed in claim 57, further comprising the steps of:
   (D) inputting the encrypted data;
   (E) generating the insertion positions $N_1, \ldots, N_P$ for the P check bits in accordance with the operation code of the instruction and the algorithm; and
   (F) removing the P check bits from the encrypted instruction input in accordance with the insertion positions $N_1, \ldots, N_P$ generated at step (E).

59. The method as claimed in claim 57, wherein the check algorithm uses a parity check algorithm.

60. The method as claimed in claim 57, wherein the check algorithm uses an ECC algorithm.

61. The method as claimed in claim 58, wherein the check algorithm uses a CRC algorithm.

62. The method as claimed in claim 58, wherein the steps (B) and (E) generate the insertion position by applying a function of right rotation in accordance with the instruction's format and a special integer.

63. The method as claimed in claim 58, wherein the steps (B) and (E) generate the insertion position by applying a function of left rotation in accordance with the instruction's format and a special integer.

64. The method as claimed in claim 58, wherein I+P=32, I is the number of bits in the instruction.

* * * * *